United States Patent
Min et al.

(10) Patent No.: US 6,765,711 B2
(45) Date of Patent: Jul. 20, 2004

(54) MICROMIRROR DRIVER AND METHOD OF CONTROLLING MICROMIRROR DRIVER

(75) Inventors: Young-hun Min, Gyeonggi-do (KR); Hwan-young Choi, Gyeonggi-do (KR); Hyung-jae Shin, Gyeonggi-do (KR); Jeong-kwan Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 10/086,440

(22) Filed: Mar. 4, 2002

(65) Prior Publication Data

US 2002/0158548 A1 Oct. 31, 2002

(30) Foreign Application Priority Data

Mar. 2, 2001  (KR) ......................................... 2001-10916
Mar. 2, 2001  (KR) ......................................... 2001-10917

(51) Int. Cl.[7] .............................. G02B 26/00; G02F 1/29
(52) U.S. Cl. ..................... 359/290; 359/291; 310/309
(58) Field of Search .................................. 359/290, 291, 359/224, 214, 254, 295, 223; 310/36, 90, 309; 73/504.02, 504.12

(56) References Cited

U.S. PATENT DOCUMENTS

| | | | | |
|---|---|---|---|---|
| 4,421,381 A | * | 12/1983 | Ueda et al. | 310/36 |
| 5,212,582 A | * | 5/1993 | Nelson | 359/224 |
| 5,506,720 A | * | 4/1996 | Yoon | 359/224 |
| 5,552,923 A | * | 9/1996 | Min | 359/224 |
| 5,959,760 A | * | 9/1999 | Yamada et al. | 359/224 |

* cited by examiner

Primary Examiner—Georgia Epps
Assistant Examiner—M. Hasan
(74) Attorney, Agent, or Firm—Staas & Halsey LLP

(57) ABSTRACT

A micromirror driver for simultaneously and independently controlling a resonant frequency and an amplitude of a micromirror. A micromirror having a plurality of grooves is supported in rotation by an elastic body. Base electrodes having a comb shape are affixed to the grooves and along an edge of the micromirror. A plurality of driver electrodes also having a comb shape are respectively engaged with the base electrodes in a gear like arrangement to electrostatically interact with the micromirror in response to applied voltages. An amplitude and a frequency of the micromirror are controlled by varying a magnitude or a waveform of one or more electrode voltages or by varying a phase between voltages applied to at least two electrodes. Accordingly, greater driving forces, a larger rotation angle of the micromirror, and independent control of amplitude and resonant frequency of the micromirror are obtained.

58 Claims, 4 Drawing Sheets

MICROMIRROR DRIVER AND METHOD OF CONTROLLING MICROMIRROR DRIVER

CROSS REFERENCE TO RELATED APPLICATIONS

This application claims the benefit of Korean Application Nos. 2001-10916 and 2001-10917, both filed Mar. 2, 2001, in the Korean Patent Office, the disclosures of which are incorporated herein by reference.

BACKGROUND OF THE INVENTION

1. Field of the Invention

The present invention relates to a micromirror driver, and more particularly, to a micromirror driver which controls a resonant frequency and an amplitude of a micromirror as the micromirror rotates due to electrostatic forces, and increases a rotation angle of the micromirror using a lower voltage, and to a method of controlling the micromirror driver.

2. Description of the Related Art micromirror drivers are operated by electrostatic forces and switch a path, along which light beams are reflected, using a rotation angle of a micromirror.

Referring to FIG. 1, a conventional micromirror driver comprises a frame 5, a trench 10 formed in the frame 5, a micromirror 20 received in the trench 10 and having a base electrode 15, a torsion spring 25 which supports the micromirror 20 in rotation, and an electrode 30 which interacts with the base electrode 15 to rotate the micromirror 20.

The micromirror 20 rotates about the torsion spring 25 due to electrostatic forces generated between the base electrode 15 and the electrode 30, as shown in FIG. 2. If the micromirror sufficiently rotates with a predetermined rotation angle, the micromirror 20 is restored to a horizontal state due to elastic restoring forces of the torsion spring 25. The micromirror 20 repeatedly rotates in the above-described manner. It is possible to allow a rotating body, such as the micromirror 20, to rotate with a greater rotation angle with a use of less voltage, taking advantage of resonance characteristics of an oscillating body. In other words, it is possible to effectively operate an oscillating body with less driving forces if the oscillating body is operated with a frequency, which is the same as a resonant frequency of the oscillating body.

A conventional method of adjusting the resonant frequency of a micromirror increases or decreases a mass of the micromirror and a spring constant of a torsion spring. However, such a mass of the micromirror and the spring constant of a torsion spring are set in accordance with manufacturing conditions and may vary according to an environment, in which the micromirror is manufactured or is driven. Accordingly, it is difficult to obtain a precise resonant frequency of the micromirror due to variations in the manufacture of the micromirror. Thus, various efforts have been made to control the resonant frequency of a micromirror after manufacturing the micromirror.

The resonant frequency f of an oscillating body can be expressed by Equation (1).

$$f = \frac{1}{2\pi}\sqrt{\frac{K_t}{I}} \quad (1)$$

In Equation (1), $K_t$ represents a spring constant, and I represents an inertia moment.

The equation of motion concerning the micromirror 20 rotating with a predetermined rotation angle ($\theta$) is shown below as Equation (2).

$$I\ddot{\theta} + C_t\dot{\theta} + K_t\theta = \tau(\theta, V) \quad (2)$$

$$= \frac{1}{2}\frac{d}{d\theta}(CV^2)$$

In Equation (2), I represents an inertia moment, $C_t$ represents capacitance between the base electrode 15 of the micromirror 20 and the electrode 30, $K_t$ represents the spring constant of the torsion spring 25, and $\tau$ represents a rotation moment (torque). Where $V_0$, $\alpha$, and V represent an initial voltage of the electrode 30, an arbitrary coefficient and a driving voltage of the electrode 30, respectively, and $V=(V_0+\alpha\theta)$, Equation (2) can be rearranged into Equation (3)

$$I\ddot{\theta} + C_t\dot{\theta} + K_t\theta = \frac{1}{2}\frac{dC}{d\theta}V^2 + \frac{1}{2}C(2V)\frac{dV}{d\theta} \quad (3)$$

$$= \frac{1}{2}\frac{dC}{d\theta}(V_0^2 + 2V_0\alpha\theta + \alpha^2\theta^2) + \frac{1}{2}C2(V_0+\alpha\theta)\alpha$$

by substitution of $V=(V_0+\alpha\theta)$.

The capacitance $C_t$ is linearly varied with respect to the rotation angle $\theta$ of the micromirror 20, as shown in FIG. 3. In other words, as the rotation angle $\theta$ of the micromirror 20 increases, the distance between the base electrode 15 and the electrode 30 increases, and thus the capacitance $C_t$ linearly decreases. Accordingly, a variation of the capacitance $C_t$ with respect to a variation of the rotation angle $\theta$ becomes a constant $\gamma$.

The constant $\gamma$ can be expressed as $$\frac{dC}{d\theta} = \gamma.$$

Accordingly, $C=C_0+\gamma\theta$ where $C_0$ represents a capacitance value when $\theta=0$. Equation (3) can be rearranged into Equation (4) by substitutions of $$\frac{dC}{d\theta} = \gamma$$

and $C=C_0+\gamma\theta$.

$$I\ddot{\theta} + C_t\dot{\theta} + K_t\theta = \frac{1}{2}[(\gamma V_0 + 2\alpha C_0)V_0 + (4\gamma\alpha V_0 + 2\alpha^2 C_0)\theta + 3\gamma\alpha^2\theta^2] \quad (4)$$

In the right side of Equation (4), ($\gamma V_0+2\alpha C_0$) affects the rotation amplitude of the micromirror 20, ($4\gamma\alpha V_0+2\alpha^2 C_0$) affects the resonant frequency f of the micromirror 20, and $3\gamma\alpha^2$ affects both the amplitude and the resonant frequency of the micromirror 20. Here, if the resonant frequency f of the micromirror 20 is controlled by adjusting $\alpha$, the voltage V of the driving voltage of the electrode 30 is varied because $V=(V_0+\alpha\theta)$. If the initial voltage $V_0$ of the electrode 30 is varied, $\alpha$ is also varied. Thus, it is impossible to simultaneously control the frequency f and the amplitude of the micromirror 20. In other words, elements required to control the frequency f and the amplitude of the micromirror 20 are dependent on each other, and thus if one of the elements is controlled, the other element is affected by the controlled element and cannot be controlled simultaneously or independently.

SUMMARY OF THE INVENTION

To solve the above-described problems, it is an object of the present invention to provide a micromirror driver, in which a frequency controlling electrode and an amplitude controlling electrode operate independently and thus a resonant frequency and an amplitude of a micromirror are independently and simultaneously controllable, allowing the micromirror to rotate with a larger rotation angle by decreasing a spring constant of a rotation axis of the micromirror. Another object of the present invention is to provide a method of controlling a micromirror driver.

Additional objects and advantages of the invention will be set forth in part in the description which follows, and, in part, will be obvious from the description, or may be learned by practice of the invention.

Accordingly, to achieve the above and other objects of the invention, according to one aspect of the present invention, there is provided a micromirror driver. The micromirror driver comprises a micromirror having at least one groove, an elastic body which supports the micromirror in rotation, and at least one electrode which receives a voltage to generate electrostatic forces to rotate the micromirror through interaction of the electrostatic forces with the micromirror. The amplitude and frequency of the micromirror are controlled by varying one of a magnitude and a waveform of the voltage of the at least one electrode.

Each groove is formed in a respective peripheral area of the micromirror and is arranged near a rotation axis of the micromirror.

Preferably, a first electrode controls the frequency of the micromirror during rotation of the micromirror, a second electrode controls the amplitude of the micromirror during the rotation of the micromirror, and the second electrode operates independently of the first electrode.

A voltage V of the at least one electrode satisfies the equation, $V^2=V_0+\alpha\theta$, where $V_0$ represents an initial voltage of the at least one electrode, $\alpha$ represents an arbitrary coefficient, and $\theta$ represents a rotation angle of the micromirror. A voltage $V_1$ of the first electrode satisfies the equation, $V_1^2=V_0$, and a voltage $V_2$ of the second electrode satisfies the equation, $V_2^2=V_0$.

A base electrode is formed on the micromirror and the base electrode and the first and second electrodes are formed in a comb shape and the combs of the first and second electrodes and the comb of the base electrode are arranged gear-like so that an effective area of opposing surfaces of the electrodes is maximized.

Preferably, a plurality of grooves are formed in the micromirror and arranged symmetrically with respect to the rotation axis of the micromirror.

In order to achieve the above and other objects of the present invention, according to another aspect of the present invention, there is provided a micromirror driver. The micromirror driver comprises a micromirror having at least one groove and a base electrode formed at the groove, an elastic body which supports the micromirror in rotation, and at least two electrodes which drive the micromirror in rotation by generating electrostatic forces through interaction of the at least two electrodes with the base electrode and, the at least two electrodes operating independently of each other.

One of the at least two electrodes is used to control the frequency of the micromirror by varying a waveform of a voltage applied to the one electrode.

The other of the at least two electrodes is used to control the amplitude of the micromirror by varying the magnitude of the voltage applied to the other of the at least two electrodes.

In order to achieve the above and other objects of the present invention, according to another aspect of the present invention, there is provided a method of controlling a micromirror driver, which comprises a micromirror, an elastic body supporting the micromirror in rotation, and at least one electrode. The method comprises: generating electrostatic forces between the micromirror and the at least one electrode; a voltage V of the at least one electrode to satisfy an equation, $V^2=V_0+\alpha\theta$ where $V_0$ represents an initial voltage of the at least one electrode, $\alpha$ represents an arbitrary coefficient, and $\theta$ represents a rotation angle of the micromirror, and controlling a frequency and/or an amplitude of the micromirror by varying the initial voltage $V_0$ of the at least one electrode and the arbitrary coefficient $\alpha$.

Preferably, a second electrode controls a resonant frequency $f$ of the micromirror by varying the arbitrary coefficient $\alpha$ in an equation, $V^2=\alpha\theta$, and the resonant frequency $f$ of the micromirror is expressed by the equation, $$f = \frac{1}{2\pi}\sqrt{\frac{K_t - \gamma_2\alpha}{I}}$$

wherein $K_t$ represents the spring constant of the elastic body, I represents an inertia moment of the micromirror, and $\gamma_2$ represents a variation of capacitance with respect to a variation of the rotation angle $\theta$ of the micromirror.

The second electrode controls the resonant frequency $f$ of the micromirror by varying the arbitrary coefficient $\alpha$ in the equation, $V^2=\alpha\theta$, and in a case where a voltage with a phase difference of $\pi/2$ is applied to the first and second electrodes, the resonant frequency $f$ of the micromirror can be expressed by the equation, $$f = \frac{1}{2\pi}\sqrt{\frac{K_t + \gamma_2\alpha}{I}}$$

wherein $K_t$ represents the spring constant of the elastic body, I represents the inertia moment of the micromirror, and $\gamma_2$ represents a variation of capacitance with respect to a variation of the rotation angle $\theta$ of the micromirror.

In order to achieve the above and other objects, according to another aspect of the present invention, there is provided a method of controlling a micromirror driver, which comprises a micromirror, an elastic body supporting the micromirror in rotation, and at least one electrode which rotates the micromirror by generating electrostatic forces through interaction with the micromirror. The method includes the step of comprising controlling the resonant frequency of the micromirror by varying the waveform of the driving voltage of the at least one electrode.

BRIEF DESCRIPTION OF THE DRAWINGS

The above objects and advantages of the present invention will become more apparent by describing in detail an embodiment thereof with reference to the attached drawings in which.

DESCRIPTION OF THE PREFERRED EMBODIMENTS

Figure 1:
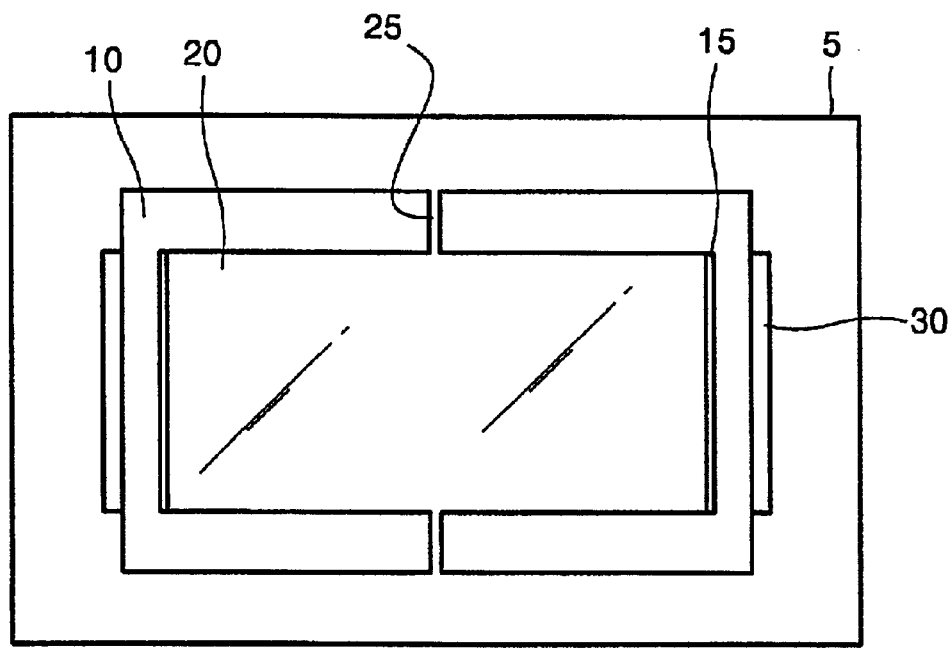
FIG. 1 is a schematic plan view of a conventional micromirror driver.
Figure 2:
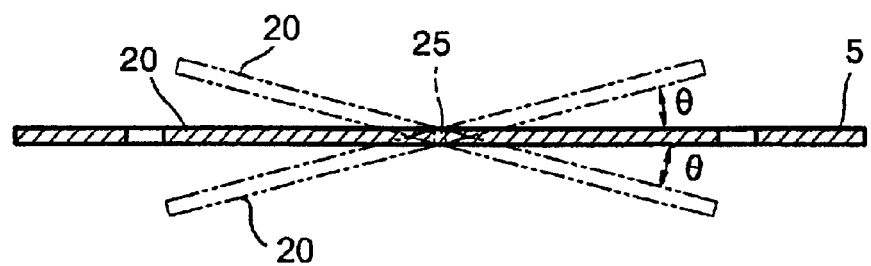
FIG. 2 is a diagram illustrating rotation of a conventional micromirror.

Reference will now be made in detail to the present embodiments of the present invention, examples of which are illustrated in the accompanying drawings, wherein like reference numerals refer to like elements throughout.

Figure 4A:
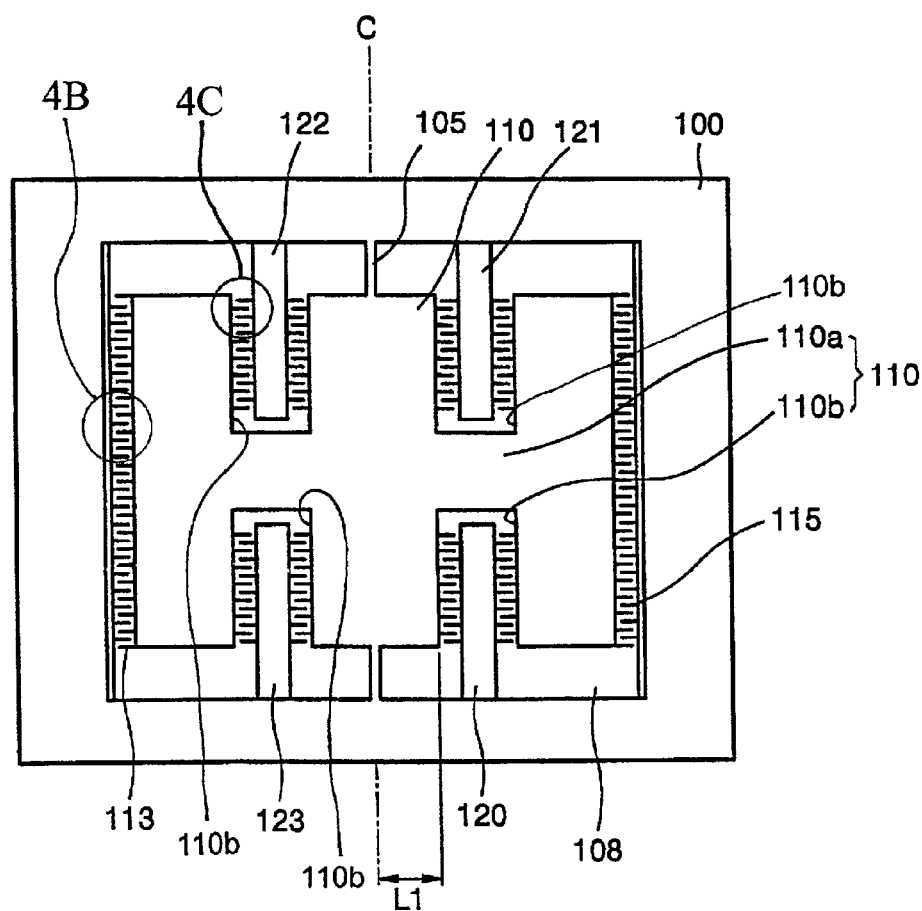
FIG. 4A is a plan view of a micromirror driver according to an embodiment the present invention.
Figure 4B:
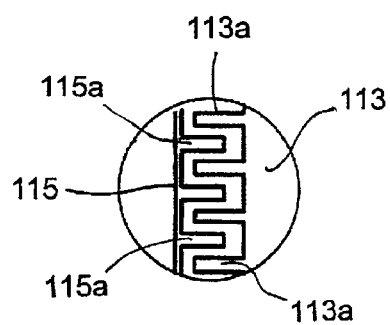
FIG. 4B is an enlarged view of a portion of FIG. 4A, showing an engagement of a first portion of a base electrode and a driver electrode.
Figure 4C:
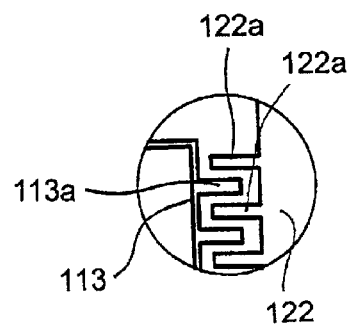
FIG. 4C is an enlarged view of a portion of FIG. 4A, showing an engagement of a second portion of the base electrode and another driver electrode.

Referring to FIGS. 4A, 4B and 4C, a micromirror driver according to the present invention comprises a frame 100, a micromirror 110, a trench 108 having sufficient space in which to rotate the micromirror 110, an elastic body 105 which elastically supports the micromirror in rotation, and at least one electrode to drive the micromirror 110.

The micromirror 110 comprises a reflector 110a, by which light beams incident on the micromirror 110 are reflected, and at least one groove 110b formed in a peripheral area of the reflector 111a.

A first electrode 115, controls a rotation amplitude of the micromirror 110 according to a magnitude of a first voltage applied to the first electrode 115, and second electrodes 120, 121, 122, and 123, control a resonant frequency $f$ of the micromirror 110 by controlling a waveform of a second voltage applied to at least one of the second electrodes 120, 121, 122 and 123, the second electrodes operating independently of the first electrode 115. The first electrode 115 is located at a side or both sides of the trench 108 in a direction parallel with the elastic body 105. Preferably, the second electrodes 120, 121, 122, and 123 are each located to be inserted into a respective groove 110b.

A base electrode 113, which interacts with the first electrode 115 and the second electrodes 120, 121, 122, and 123 to generate electrostatic forces, is located to face the first electrode 115 and the second electrodes 120, 121, 122, and 123. In particular, since the base electrode 113 is formed at sidewalls of the groove 110b of the micromirror 110, the effective area where the driving force of the micromirror is primarily obtained is maximized. That is, a larger area for interaction of the electrodes is obtained, which serves to enhance the driving force of the micromirror, where the groove 110b is formed around the micromirror 110 as compared with a conventional micromirror formed in a plate shape without a groove. In order to maximize the area of the opposing surface of the base electrode 113 and the first and second electrodes 115, and 120 through 123, the first electrode 115, the second electrodes 120 through 123, and the base electrode 113 are formed in a comb shape. The first electrode 115 comprises a plurality of projections 115a as shown in FIG. 4B and the second electrodes 120 through 123 each comprise a plurality of projections of which the projections 122a shown in FIG. 4C are exemplary. The base electrode 113 comprises a plurality of projections 113a which are arranged to be in gear with the projections 115a of the first electrode 115 or the projections of each of the second electrodes 120 through 123. The reflector 110a may be formed to have a minimum surface area as long as the reflector 110a does not lose a function of reflection of light beams. Preferably, the grooves 110b are formed to be symmetrical with respect to a rotation axis C of the micromirror 110.

Next, a method of controlling a micromirror driver having structure as described with reference to FIG. 4 will be described below.

The micromirror 110 is rotated due to electrostatic forces generated by interaction between the base electrode 113 and the first and second electrodes 115, and 120 through 123. Here, a voltage V of the electrodes used to drive the micromirror 110 is expressed by a term for determining the magnitude of the voltage V and a term for determining a waveform of the voltage V. For example, the driving voltage V of the micromirror 110 is formed into $V^2=V_0+\alpha\theta$ where $V_0$ represents an initial voltage and a represents an arbitrary coefficient.

Figure 5:
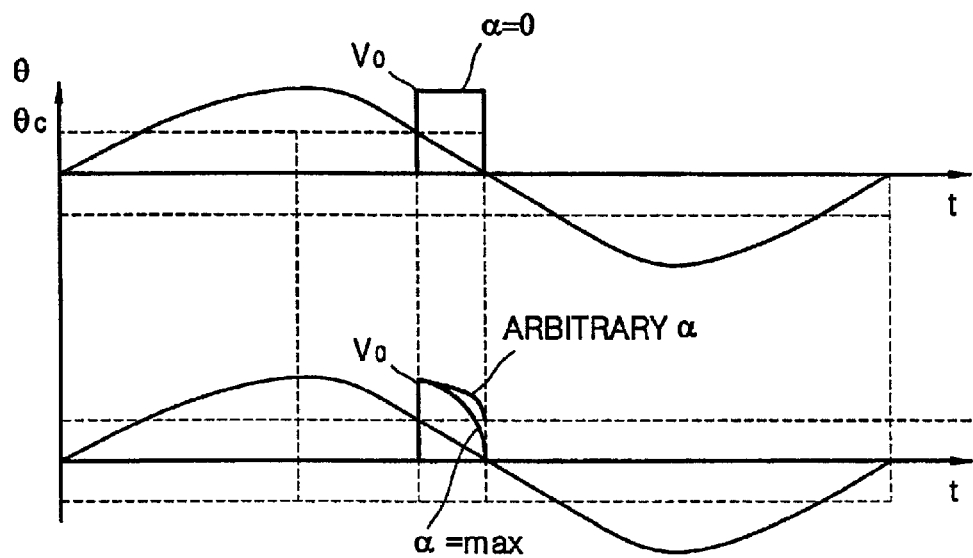
FIG. 5 is a graph showing a relationship between a driving voltage and motion of a micromirror according to an embodiment of the present invention.

FIG. 5 is a graph showing time to apply a driving voltage V and variation of the waveform of the driving voltage V with respect to an arbitrary coefficient a according to the motion of the micromirror 110. Here, a critical angle θc represents the maximum angle, by which the micromirror 110 is rotated due to electrostatic forces. As shown in FIG. 5, the waveform of the voltage varies in accordance with a variations.

Figure 6:
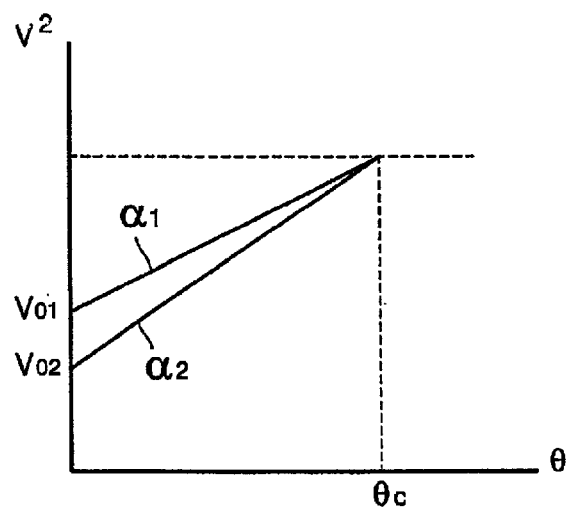
FIG. 6 is a graph showing a variation of the driving voltage of the micromirror with respect to a rotation angle of the micromirror.

FIG. 6 is a graph showing variation of a driving voltage $V^2$ with respect to a rotation angle θ. As shown in FIG. 6, the driving voltage $V^2$ is proportional to the rotation angle θ of the micromirror 110, and accordingly, a depends on an initial voltage $V_0$ when the driving voltage $V^2$ reaches a predetermined level. In other words, if the initial value $V_0$ is varied when the driving voltage $V^2$ reaches a predetermined level, α also varies.

In a case where $V^2=V_0+\alpha\theta$ and only one electrode is used, Equation (2) can be rearranged into Equation (5) by substitution of $V^2$.

$$I\ddot{\theta} + C_t\dot{\theta} + K_t\theta = \frac{1}{2}\frac{d}{d\theta}(CV^2) \qquad (5)$$

$$= \frac{1}{2}\frac{dC}{d\theta}V^2 + \frac{1}{2}C\frac{dV^2}{d\theta}$$

$$= \frac{1}{2}\frac{dC}{d\theta}(V_0 + \alpha\theta) + \frac{1}{2}C\alpha$$

As described above, if $$\frac{dC}{d\theta} = \gamma,$$

$C=C_0+\gamma\theta$. Accordingly, Equation (5) can be rearranged into Equation (6) by the substitution of $$\frac{dC}{d\theta} = \gamma$$

and $C=C_0+\gamma\theta$.

$$I\ddot{\theta} + C_t\dot{\theta} + [K_t - \gamma\alpha]\theta = \frac{1}{2}(\gamma V_0 + \alpha C_0) \qquad (6)$$

Here, $K_t-\gamma\alpha$ affects the frequency of the micromirror 110, and $$\frac{1}{2}(\gamma V_0 + \alpha C_0)$$

affects the amplitude of the micromirror 110. According to Equation (6), the frequency $f$ is controllable, while varying the coefficient $\alpha$ and amplitude of the micromirror 110, and while varying the initial voltage $V_0$.

In a case where $V^2 = V_0 + \alpha\theta$, $V_1^2 = V_0$, and $V_2^2 = \alpha\theta$ ($V_1$ represents the voltage of the first electrode, and $V_2$ represents the voltage of the second electrodes), the driving voltage V of the micromirror 110 can be expressed by Equation (7).

$$V = V_1^2 + V_2^2$$
$$V_1^2 = V_0,$$
$$V_2^2 = \alpha\theta \qquad (7)$$

Equation (8) can be obtained by substituting Equation (7) into Equation (2) and rearranging Equation (2) with respect to the rotation angle $\theta$ of the micromirror 110.

$$\begin{aligned} I\ddot{\theta} + C_t\dot{\theta} + K_t\theta &= \frac{1}{2}\frac{d}{d\theta}(CV^2) \\ &= \frac{1}{2}\left(\frac{dC}{d\theta}\right)(V_1^2 + V_2^2) + \frac{1}{2}C\frac{d}{d\theta}(V_1^2 + V_2^2) \\ &= \frac{1}{2}\left(\frac{dC}{d\theta}\right)V_1^2 + \frac{1}{2}\left(\frac{dC}{d\theta}\right)V_2^2 + \frac{1}{2}C\left(\frac{dV_1^2}{d\theta}\right) + \frac{1}{2}C\left(\frac{dV_2^2}{d\theta}\right) \end{aligned} \qquad (8)$$

In the right side of Equation (8), $$\left(\frac{dC}{d\theta}\right)$$

of the first term concerns the first electrode 115 and thus will be marked with subscript 1. On the other hand, $$\left(\frac{dC}{d\theta}\right)$$

of the second term concerns the second electrodes 120 through 123 and thus will be marked with subscript 2. As described above, C varies linearly with respect to $\theta$, and thus the differentiation terms of capacitance with respect to $\theta$, concerning the first and second electrodes 115, and 120 through 123, can be represented by $\gamma_1$ and $\gamma_2$, respectively. Accordingly, $$\left(\frac{dC}{d\theta}\right)_1 = \gamma_1$$

and $$\left(\frac{dC}{d\theta}\right)_2 = \gamma_2.$$

Equation (8) can be rearranged into Equation (9) by substitution of $V_1^2 = V_0$ and $V_2^2 = \alpha\theta$.

$$I\ddot{\theta} + C_t\dot{\theta} + K_t\theta = \frac{1}{2}\gamma_1 V_0 + \frac{1}{2}\gamma_2\alpha\theta + \frac{1}{2}C_2\alpha \qquad (9)$$

Equation (9) can be rearranged into Equation (10) by substitution of $C_2 = C_{20} + \gamma_2\theta$ where $C_{20}$ represents the value of $C_2$ when $\theta$ is 0.

$$\begin{aligned} I\ddot{\theta} + C_t\dot{\theta} + K_t\theta &= \frac{1}{2}\gamma_1 V_0 + \frac{1}{2}\gamma_2\alpha\theta + \frac{1}{2}(C_{20} + \gamma_2\theta)\alpha \\ &= \frac{1}{2}\gamma_1 V_0 + \gamma_2\alpha\theta + \frac{1}{2}C_{20}\alpha \end{aligned} \qquad (10)$$

Equation (10) can be rearranged with respect to the rotation angle $\theta$ of the micromirror 110 into Equation (11).

$$I\ddot{\theta} + C_t\dot{\theta} + (K_t - \gamma_2\alpha)\theta = \frac{1}{2}(\gamma_1 V_0 + \alpha C_{20}) \qquad (11)$$

$(K_t - \gamma_2\alpha)$ in the left side of Equation (11) which is the coefficient of $\theta$, affects the resonant frequency $f$ of the micromirror 110, and $$\frac{1}{2}(\gamma_1 V_0 + \alpha C_{20})$$

in the right side of Equation (11) affects the amplitude of the micromirror 110. In other words, the resonant frequency $f$ of the micromirror can be expressed by Equation (12) using Equations (1), (2), and (11).

$$f = \frac{1}{2\pi}\sqrt{\frac{K_t - \gamma_2\alpha}{I}} \qquad (12)$$

According to Equation (12), the resonant frequency $f$ of the micromirror 110 is controllable by vying an arbitrary coefficient $\alpha$. The amplitude of the micromirror 110 can be controlled by $$\frac{1}{2}(\gamma_1 V_0 + \alpha C_{20})$$

of Equation (11). Where the resonant frequency $f$ of the micromirror 110 is controlled by varying $\alpha$, the amplitude of the micromirror 110 is also affected by the variation of $\alpha$. However, the amplitude of the micromirror 110 is controllable by controlling $V_0$. Here, since $V_0$ is an independent variable, which is not affected by the variation of $\alpha$, the amplitude of the micromirror 110 is controllable independently of the control of the resonant frequency $f$ of the micromirror 110. Accordingly, the resonant frequency and amplitude of the micromirror 110 are satisfactorily controllable independently and simultaneously.

In another method of controlling a micromirror driver, the resonant frequency $f$ of the micromirror 110 is controllable by applying a voltage with a predetermined phase difference to the first and second electrodes 115, and 120 through 123. For example, if voltages with a phase difference of $\pi/2$ are applied to the first and second electrodes 115, and 120 through 123, $\gamma_2\alpha$ has a negative value. Thus, the resonant frequency $f$ of the micromirror 110 can be expressed by Equation (13).

$$f = \frac{1}{2\pi}\sqrt{\frac{K_t + \gamma_2 \alpha}{I}} \qquad (13)$$

Here, $K_t$ represents the spring constant of the elastic body 105, I represents inertia moment, and $\gamma_2$ represents a variation of capacitance with respect to a variation of the rotation angle θ of the micromirror 110. According to Equation (13), the resonant frequency $f$ of the micromirror 110 is controllable by controlling an arbitrary coefficient α, which determines the waveform of the voltage.

As described above, since the micromirror 110 in the micromirror driver according to the present invention includes the groove 110b to maximize an area prepared for electrodes to be installed, the mass of the micromirror 110 can be reduced to less than a mass of a conventional plate-shaped micromirror. As the mass of the micromirror 110 decreases, the inertia moment I of the micromirror 110 decreases. If the inertia moment I of the micromirror 110 decreases, and the resonant frequency $f$ of the micromirror 110 is maintained at a predetermined level, the spring constant $K_t$ of the elastic body 105 decreases according to Equation (12). However, the micromirror 110 is driven against restoring elastic forces of the elastic body 105 having a predetermined spring constant $K_t$. Thus, as the elastic body 105 has a lower spring constant $K_t$, less driving force is required to rotate the micromirror 110 with a predetermined rotation angle. In other words, as the spring constant $K_t$ of the elastic body 105 becomes lower, a larger rotation angle of the micromirror 110 is obtained with less driving force. Accordingly, the micromirror driver according to the present invention uses the groove 110b as an area prepared for electrodes to be installed and reduces the spring constant $K_t$ of the elastic body 105 with the use of the groove 110b.

As described above, the base electrode 113 and the first and second electrodes 115, and 120 through 123 are formed in a comb shape. Since the base electrode 113 is, arranged to be in gear with the first or second electrodes 115, or 120 through 123, the area of the opposing surface of the base electrode 113 and the first or second electrodes 115, and 120 through 123 is maximized, and thus effective electrostatic forces generated by interaction between the base electrode 113 and the first and second electrodes 115, and 120 through 123 is maximized with the use of a predetermined voltage.

Figure 3:
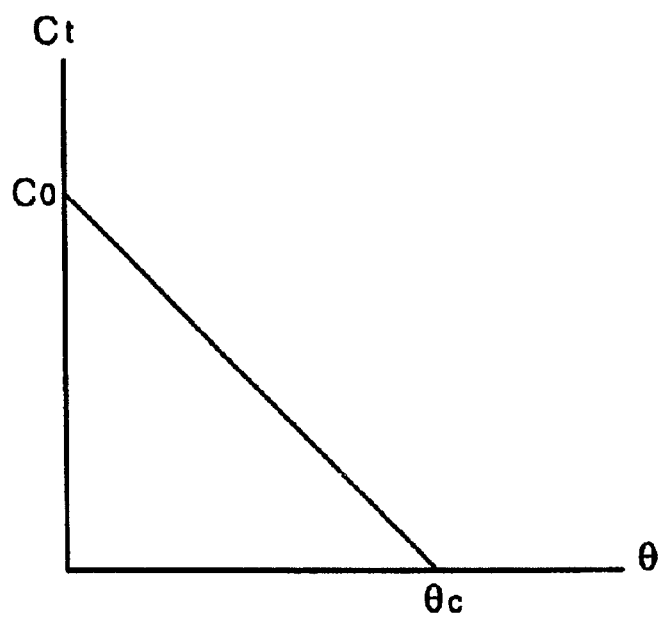
FIG. 3 is a graph showing a variation of capacitance with respect to a rotation angle of a conventional micromirror.

In the meantime, as the distance L1 (FIG. 3) between the rotation axis C of the micromirror 110 and the first or second electrodes 115, or 120 through 123 decreases, the critical angle $\theta_c$ of the micromirror 110 increases. If the critical angle $\theta_c$ of the micromirror 110 increases, the degree, to which electrostatic forces affect the micromirror 110 increases, and thus the range, in which the resonant frequency $f$ of the micromirror 110 is controllable, increases even when the micromirror 110 rotates with a very large rotation angle. In the present invention, since the first and second electrodes 115, or 120 through 123 are arranged at the sidewalls of the groove, the distance L1 between the rotation axis of the micromirror 110 and the first or second electrodes 115, or 120 through 123 is minimized.

As described above, since the micromirror driver according to the present invention includes a electrode which controls the resonant frequency of a micromirror and a second electrode which controls the amplitude of the micromirror, which operates independently of the resonant frequency controlling electrode and is not affected by the resonant frequency controlling electrode, the resonant frequency and the amplitude of the micromirror are controllable simultaneously and independently of each other.

In addition, the micromirror driver according to the present invention obtains a large rotation angle of the micromirror by reducing the inertia moment of the micromirror and the spring constant of the elastic body, while maintaining the effective area of the micromirror.

Finally, since an area which engages the resonant frequency controlling electrode and an area which engages the amplitude controlling electrode are prepared in the micromirror of the micromirror driver according to the present invention, greater driving forces are obtained with the use of less voltage. In addition, since the distance between the rotation axis of the micromirror and the controlling electrodes is reduced and the area of the opposing surface of electrodes interacting with each other is increased, the range, in which the resonant frequency of the micromirror is controllable, is expanded even where the micromirror rotates with a very large rotation angle.

Although a few embodiments of the present invention have been shown and described, it would appreciated by those skilled in the art that changes may be made in these embodiments without departing from the principles and spirit of the invention, the scope of which the claims and their equivalents.

What is claimed is:

1. A micromirror driver comprising:
   a micromirror having at least one groove;
   an elastic body which supports the micromirror in rotation; and
   at least one electrode which controls the rotation of the micromirror by generating electrostatic forces through interaction between the micromirror and the at least one electrode according to a voltage of the at least one electrode, each electrode disposed in a respective groove,
   wherein an amplitude and a frequency of the rotation of the micromirror are controlled by varying one of a magnitude and a waveform of the voltage of the at least one electrode.

2. The micromirror driver of claim 1, wherein:
   the at least one groove is arranged near a rotation axis of the micromirror.

3. The micromirror driver of claim 2, wherein the at least one electrode comprises:
   a first electrode which controls the frequency of rotation of the micromirror; and
   a second electrode which controls the amplitude of rotation of the micromirror, wherein the second electrode operates independently of the first electrode.

4. The micromirror driver of claim 2, wherein:
   the voltage (V) of the at least one electrode satisfies an equation, $V^2 = V_0 + \alpha\theta$, where:
   $V_0$ represents an initial voltage of the at least one electrode,
   α represents an arbitrary coefficient, and
   θ represents a rotation angle of the micromirror.

5. The micromirror driver of claim 4, wherein the at least one electrode comprises first and second electrodes and a voltage ($V_1$) of the first electrode satisfies an equation, $V_1^2 = V_0$.

6. The micromirror driver of claim 4, wherein the at least one electrode comprises first and second electrodes and a voltage ($V_2$) of the second electrode satisfies an equation, $V_2^2 = V_0$.

7. The micromirror driver of claim 4, wherein the at least one electrode is formed in a comb shape so that an effective area of the at least one electrode which interacts with the micromirror is maximized.

8. The micromirror driver of claim 4, wherein the at least one electrode comprises first and second electrodes and a voltage ($V_2$) of the second electrode satisfies an equation, $V_2^2 = \alpha\theta$.

9. The micromirror driver of claim 8, wherein the first and second electrodes are formed in a comb shape so that respective first and second effective areas of the first and second electrodes which interact with the micromirror are maximized.

10. The micromirror driver of claim 9, wherein the at least one groove comprises a plurality of grooves which are symmetrically arranged with respect to the rotation axis of the micromirror.

11. The micromirror driver of claim 1, wherein:
the at least one groove comprises a plurality of grooves, symmetrically arranged with respect to a rotation axis of the micromirror; and
the micromirror driver comprises a plurality of electrodes, each electrode disposed in a respective one of the plurality of grooves.

12. The micromirror driver of claim 11, wherein each of the plurality of electrodes is formed in a comb shape so an effective area of each of the plurality of electrodes which interacts with the micromirror is maximized.

13. A micromirror driver comprising:
a micromirror having at least one groove and comprising a base electrode formed at the at least one groove;
an elastic body which supports the micromirror in rotation; and
at least two electrodes which electrostatically interact with the base electrode to rotate the micromirror, wherein one of the at least two electrodes operates independently of another of the at least two electrodes.

14. The micromirror driver of claim 13, wherein each groove is formed at a peripheral portion of the micromirror and arranged near a rotation axis of the micromirror.

15. The micromirror driver of claim 14, wherein the at least two electrodes and the base electrode are formed in a comb shape, and the base electrode is arranged in a gear-like engagement with each of the at least two electrodes so that an effective area of opposing surfaces of each of the at least two electrodes and the base electrode is maximized.

16. The micromirror driver of claim 15, wherein one of the at least two electrodes controls a frequency of the micromirror by varying a waveform of a voltage applied to the one of the at least two electrodes.

17. The micromirror driver of claim 16, wherein another of the at least two electrodes controls an amplitude of the micromirror by varying a magnitude of a voltage applied to the another of the at least two electrodes.

18. The micromirror driver of claim 17, wherein the voltage (V) of the at least two electrodes satisfies an equation, $V^2 = V_0 + \alpha\theta$ where:
$V_0$ represents an initial voltage of the at least two electrodes,
$\alpha$ represents an arbitrary coefficient, and
$\theta$ represents a rotation angle of the micromirror.

19. The micromirror driver of claim 18, wherein the at least two electrodes comprise an electrode which controls the amplitude of the micromirror in response to a voltage $V_1$ which satisfies an equation, $V_1^2 = V_0$.

20. The micromirror driver of claim 19, wherein:
another of the at least two electrodes controls a resonant frequency of the micromirror in response to a voltage $V_2$ which satisfies an equation, $V_2^2 = \alpha\theta$, and the resonant frequency of the micromirror is controlled by varying $\alpha$.

21. The micromirror driver of claim 20, wherein the grooves are symmetrically formed with respect to the rotation axis of the micromirror.

22. The micromirror driver of claim 15, wherein one of the at least two electrodes controls an amplitude of the micromirror by varying a magnitude of a voltage applied to the one of the at least two electrodes.

23. The micromirror driver of claim 22, wherein a voltage (V) of the at least two electrodes satisfies an equation, $V^2 = V_0 + \alpha\theta$ where:
$V_0$ represents an initial voltage of the at least two electrodes,
$\alpha$ represents an arbitrary coefficient, and
$\theta$ represents a rotation angle of the micromirror.

24. The micromirror driver of claim 23, wherein the at least two electrodes comprise an electrode which controls an amplitude of the micromirror in response to a voltage $V_1$ which satisfies an equation, $V_1^2 = V_0$.

25. A method of controlling a micromirror driver, which comprises a micromirror, an elastic body supporting the micromirror in rotation, and at least one electrode, the method comprising:
generating electrostatic forces between the micromirror and the at least one electrode by applying a voltage V to the at least one electrode;
setting the voltage V to satisfy an equation, $V^2 = V_0 + \alpha\theta$ where:
$V_0$ represents an initial voltage of the at least one electrode,
$\alpha$ represents an arbitrary coefficient, and
$\theta$ represents a rotation angle of the micromirror; and
controlling a frequency and/or an amplitude of the micromirror by varying the initial voltage $V_0$ of the at least one electrode and the arbitrary coefficient $\alpha$.

26. The method of claim 25, wherein:
the at least one electrode comprises a first electrode; and
the method further comprises setting a voltage $V_1$ of the first electrode to satisfy an equation, $V_1^2 = V_0$.

27. The method of claim 26, wherein:
the at least one electrode further comprises a second electrode; and
the method further comprises setting a voltage $V_2$ of the second electrode to satisfy an equation, $V_2^2 = \alpha\theta$.

28. The method of claim 27, wherein:
the setting of the voltage $V_1$ of the first electrode is independent of the setting of the voltage $V_2$ of the second electrode.

29. The method of claim 28, wherein the setting of the voltage $V_2$ of the second electrode controls a resonant frequency $f$ of the micromirror by varying the arbitrary coefficient $\alpha$ in the equation $V^2 = \alpha\theta$, wherein the resonant frequency $f$ of the micromirror is expressed by an equation, $$f = \frac{1}{2\pi}\sqrt{\frac{K_t - \gamma_2 \alpha}{I}}$$

wherein:
$K_t$ represents a spring constant of an elastic body which exerts a torque on the micromirror,
$I$ represents an inertia moment of the micromirror, and
$\gamma_2$ represents a variation of capacitance with respect to a variation of the rotation angle $\theta$ of the micromirror.

30. The method of claim 28, wherein the setting of the second voltage $V_2$ of the second electrode controls a resonant frequency $f$ of the micromirror by varying the arbitrary coefficient $\alpha$ in the equation $V^2=\alpha\theta$, where voltages V1 and V2 are applied to the first and second electrodes, respectively with a phase difference of $\pi/2$, wherein the resonant frequency $f$ of the micromirror is expressed by an equation, $$f = \frac{1}{2\pi}\sqrt{\frac{K_t + \gamma_2 \alpha}{I}}$$

wherein:
$K_t$ represents a spring constant of the elastic body which exerts a torque on the micromirror,
I represents an inertia moment of the micromirror,
$\gamma_2$ represents a variation of capacitance with respect to a variation of the rotation angle $\theta$ of the micromirror.

31. The method of claim 25, wherein:
the at least one electrode comprises a second electrode; and
the setting of the voltage V further comprises setting a voltage $V_2$ of the second electrode to satisfy an equation, $V_2^2=\alpha\theta$.

32. The method of claim 31, wherein the first and second electrodes operate independently of each other.

33. The method of claim 32, wherein the second electrode controls the resonant frequency $f$ of the micromirror by varying the arbitrary coefficient $\alpha$ in the equation $V^2=\alpha\theta$, wherein the resonant frequency $f$ of the micromirror is expressed by an equation, $$f = \frac{1}{2\pi}\sqrt{\frac{K_t + \gamma_2 \alpha}{I}}$$

wherein:
$K_t$ represents the spring constant of the elastic body,
I represents an inertia moment of the micromirror, and
$\gamma_2$ represents a variation of capacitance with respect to a variation of the rotation angle $\theta$ of the micromirror.

34. The method of claim 32, wherein the second electrode controls the resonant frequency $f$ of the micromirror by controlling the arbitrary coefficient $\alpha$ in the equation $V^2=\alpha\theta$, and in a case where respective voltages with a phase difference of $\pi/2$ are applied to the first and second electrodes, the resonant frequency $f$ of the micromirror is expressed by an equation, $$f = \frac{1}{2\pi}\sqrt{\frac{K_t + \gamma_2 \alpha}{I}}$$

wherein:
$K_t$ represents a spring constant of the elastic body,
I represents the inertia moment of the micromirror, and
$\gamma_2$ represents a variation of capacitance with respect to a variation of the rotation angle $\theta$ of the micromirror.

35. A method of controlling a micromirror driver, which comprises a micromirror, an elastic body supporting the micromirror in rotation, and at least one electrode which controls the rotation of the micromirror by generating electrostatic interaction between the micromirror and the at least one electrode according to a driving voltage, the method comprising:

controlling a resonant frequency of the micromirror by varying a waveform of the driving voltage of the at least one electrode.

36. The method of claim 35, further comprising:
controlling an amplitude of the micromirror by varying a magnitude of the driving voltage of the at least one electrode.

37. The method of claim 36, wherein:
the at least one electrode comprises a first electrode; and
the method further comprises setting a voltage ($V_1$) of the first electrode to satisfy an equation, $V_1^2=V_0$ where $V_0$ represents an initial voltage of the at least one electrode.

38. The method of claim 37, wherein:
the at least one electrode further comprises a second electrode; and
the method further comprises setting a voltage ($V_2$) of the second electrode to satisfy an equation, $V_2^2=\alpha\theta$ where a represents an arbitrary coefficient and $\theta$ represents a rotation angle of the micromirror.

39. The method of claim 38, wherein:
the setting of the voltage $V_1$ at the first electrode is independent of the setting of the voltage $V_2$ at the second electrode.

40. The method of claim 39, wherein:
the setting of the voltage $V_2$ at the second electrode controls a resonant frequency $f$ of the micromirror by controlling an arbitrary coefficient $\alpha$ in the equation, $V^2=\alpha\theta$, wherein the resonant frequency $f$ of the micromirror is expressed by an equation, $$f = \frac{1}{2\pi}\sqrt{\frac{K_t + \gamma_2 \alpha}{I}}$$

wherein:
$K_t$ represents a spring constant of the elastic body,
I represents an inertia moment of the micromirror, and
$\gamma_2$ represents a variation of capacitance with respect to a variation of a rotation angle $\theta$ of the micromirror.

41. The method of claim 39, wherein:
the setting of the voltage $V_2$ at the second electrode controls a resonant frequency $f$ of the micromirror by controlling an arbitrary coefficient $\alpha$ in the equation, $V_2^2=\alpha\theta$, and in a case where respective voltages with a phase difference of $\pi/2$ are applied to the first and second electrodes, the resonant frequency $f$ of the micromirror is expressed by an equation, $$f = \frac{1}{2\pi}\sqrt{\frac{K_t + \gamma_2 \alpha}{I}}$$

wherein:
$K_t$ represents a spring constant of the elastic body,
I represents an inertia moment of the micromirror, and
$\gamma_2$ represents a variation of capacitance with respect to a variation of a rotation angle $\theta$ of the micromirror.

42. The method of claim 36, wherein:
the at least one electrode comprises at least one second electrode; and
the method further comprises setting the voltage $V_2$ to satisfy an equation, $V_2^2=\alpha\theta$.

43. The method of claim 42, wherein the setting of the voltage $V_1$ at the first electrode is independent of the setting of the voltage $V_2$ at the second electrode.

44. The method of claim 43, wherein the setting of the voltage $V_2$ at the second electrode controls a resonant frequency $f$ of the micromirror by controlling an arbitrary coefficient $\alpha$ in the equation, $V_2^2 = \alpha\theta$, and the resonant frequency $f$ of the micromirror is expressed by an equation, $$f = \frac{1}{2\pi}\sqrt{\frac{K_t + \gamma_2 \alpha}{I}}$$

wherein:
$K_t$ represents a spring constant of the elastic body,
I represents an inertia moment of the micromirror, and
$\gamma_2$ represents a variation of capacitance with respect to a variation of a rotation angle $\theta$ of the micromirror.

45. The method of claim 43, wherein the setting of the voltage $V_2$ at the second electrode controls a resonant frequency $f$ of the micromirror by controlling an arbitrary coefficient $\alpha$ in the equation, $V_2^2 = \alpha\theta$, and in a case where respective voltages with a phase difference of $\pi/2$ are applied to the first and second electrodes, a resonant frequency $f$ of the micromirror is expressed by an equation, $$f = \frac{1}{2\pi}\sqrt{\frac{K_t + \gamma_2 \alpha}{I}}$$

wherein:
$K_t$ represents a spring constant of the elastic body,
I represents an inertia moment of the micromirror, and
$\gamma_2$ represents a variation of capacitance with respect to a variation of a rotation angle $\theta$ of the micromirror.

46. A micromirror driver comprising:
a micromirror having an outer edge and a rotation axis, the micromirror comprising:
a base electrode having a first portion formed along the outer edge of the micromirror, and a second portion formed between the outer edge of the micromirror and the rotation axis;
an elastic body which supports the micromirror for rotation about the rotation axis; and
first and second driver electrodes which electrostatically interact with the first and second portions of the base electrode, respectively, in response to an applied voltage.

47. The micromirror driver of claim 46, wherein the micromirror has a groove and the second portion of the base electrode is formed in the groove.

48. The micromirror driver of claim 47, wherein the second portion of the base electrode is formed at a sidewall of the groove and the second driver electrode is formed adjacent the sidewall.

49. The micromirror driver of claim 47, wherein the second portion of the base electrode and the second driver electrode are comb shaped and arranged in a gear like engagement.

50. The micromirror driver of claim 47, wherein the first portion of the base electrode and the first driver electrode are comb shaped and oppositely in a gear like engagement.

51. The method of claim 50, wherein $V_1$ and $V_2$ have a phase difference of $\pi/2$.

52. The micromirror driver of claim 46, wherein:
the second portion of the base electrode and the second driver electrode are comb shaped and arranged in a gear like engagement.

53. The micromirror driver of claim 46, wherein the first portion of the base electrode and the first driver electrode are comb shaped and arranged in a gear like engagement.

54. A method of controlling a micromirror which is suspended for rotation about an axis by an elastic body, the micromirror having a base electrode, a first portion of the base electrode formed along an edge of the micromirror and a second portion of the base electrode formed between the first portion of the base electrode and the rotation axis, and the micromirror driver having first and second driver electrodes disposed near the first and second portions of the base electrode, respectively, the method comprising:
applying a voltage ($V_1$) to the first driver electrode wherein $V_1$ satisfies an equation, $V_1^2 = V_0$, to control an amplitude of the micromirror; and
applying a voltage ($V_2$) to the second driver electrode wherein $V_2$ satisfies an equation, $V_2^2 = \alpha\theta$, and adjusting $\alpha$ to control a frequency of the micromirror, wherein:
$V_0$ represents an initial voltage at the electrodes, and
$\theta$ represents a rotation angle of the micromirror.

55. A micromirror driver, comprising:
a micromirror having an outer edge and a rotation axis, the micromirror comprising:
a base electrode having a first portion formed along the outer edge of the micromirror and a second portion formed between the outer edge of the micromirror and the rotation axis;
an elastic body which supports the micromirror for rotation about the rotation axis; and
first and second driver electrodes which electrostatically interact with the first and second portions of the base electrode, respectively, in response to first and second applied voltages, respectively, wherein:
the first voltage controls an amplitude of the micromirror; and
the second voltage controls a resonant frequency of the micromirror.

56. The micromirror driver of claim 55, wherein the second voltage controls the resonant frequency independently of the control of the amplitude by the first voltage.

57. The micromirror driver of claim 56, wherein the second voltage controls the resonant frequency simultaneously with the control of the amplitude by the first voltage.

58. The micromirror driver of claim 56, wherein the second voltage controls the resonant frequency independently of and simultaneously with the control of the amplitude by the first voltage.

* * * * *

UNITED STATES PATENT AND TRADEMARK OFFICE
CERTIFICATE OF CORRECTION

PATENT NO.    : 6,765,711 B2
DATED         : July 20, 2004
INVENTOR(S)   : Young-hun Min et al.

It is certified that error appears in the above-identified patent and that said Letters Patent is hereby corrected as shown below:

Column 14,
Line 19, "a" should be -- $\alpha$ --.

Signed and Sealed this

Twenty-ninth Day of March, 2005

JON W. DUDAS
*Director of the United States Patent and Trademark Office*